United States Patent
Sanders, Jr. et al.

(10) Patent No.: US 7,248,018 B2
(45) Date of Patent: Jul. 24, 2007

(54) PERSONAL RENEWABLE-ENERGY FUELING AND STORAGE STATION FOR ELECTRIC-POWERED VEHICLES

(75) Inventors: John K. Sanders, Jr., Costa Mesa, CA (US); J. Kenneth Sanders, Kailua, HI (US); Jeffrey Sanders, Reno, NV (US)

(73) Assignee: UFOZ, LLC, Kailua, HI (US)

( * ) Notice: Subject to any disclaimer, the term of this patent is extended or adjusted under 35 U.S.C. 154(b) by 257 days.

(21) Appl. No.: 11/110,094

(22) Filed: Apr. 19, 2005

(65) Prior Publication Data
US 2005/0231157 A1    Oct. 20, 2005

Related U.S. Application Data

(60) Provisional application No. 60/564,137, filed on Apr. 20, 2004.

(51) Int. Cl.
*H02J 7/00*    (2006.01)
(52) U.S. Cl. .................. 320/109; 320/101; 320/104; 320/109
(58) Field of Classification Search ............... 320/101, 320/104, 109; 180/65.1; 136/243, 244, 136/252
See application file for complete search history.

(56) References Cited

U.S. PATENT DOCUMENTS 5,315,227 A  *  5/1994   Pierson et al. ............... 320/101

\* cited by examiner

*Primary Examiner*—Tarifur Chowdhury
*Assistant Examiner*—Ramy Ramadan
(74) *Attorney, Agent, or Firm*—Leighton K. Chong (57) ABSTRACT

A personal refueling station for a personal-sized electric vehicle has a polygonal base structure housing a refueling system and a plurality of flat panels hinged thereto which open to form a flat surface and close up to an upright pyramid for storage. The flat panels have solar PV arrays mounted on their inside surfaces which generate electricity from sunlight in the open position. The electricity is used to generate hydrogen for hydrogen-fuel-cell vehicles, or is stored for recharging non-hydrogen electric vehicles. Alternatively, hydrogen or electricity may be provided from an external renewable power source. The station can also have utility hookups to provide excess hydrogen or electricity to an external energy usage, such as a home, business, or other station. The personal refueling station has a compact design that can be installed at home or business locations. It is designed to accommodate a personal-use electric vehicle such as an electric car or cart or a personal VTOL hovercraft. It can be used in a stationary location or transported for remote use, as well as operated by remote control.

20 Claims, 8 Drawing Sheets

WATER ⚊  ELECTRICITY ⚊  HYDROGEN ⚊

Fig. 13 spring-loaded hinge
Fig. 14A spring-loaded hinge
Fig. 14B regular hinge
Fig. 14C

Fig. 14

PERSONAL RENEWABLE-ENERGY FUELING AND STORAGE STATION FOR ELECTRIC-POWERED VEHICLES

This U.S. patent application claims the priority of U.S. Provisional Application 60/564,137 filed on Apr. 20, 2004, of the same title and by the same inventors.

TECHNICAL FIELD

The present invention relates to personal renewable-energy fueling and storage systems for electric vehicles, in particular, but not limited to, manned or unmanned vertical takeoff and landing vehicles.

BACKGROUND OF INVENTION

There is a growing market and need for electric vehicles that can be fueled using renewable energies such as solar, wind, hydro and biochemical (fuel cell) processes that produce electricity. While there are existing renewable energy systems for supplying electricity to homes and businesses, there are no currently no known systems adapted for use as personal vehicle fueling and storage stations.

Currently, the electric vehicle market is targeting the use of hydrogen fuel cells for electric refueling in accordance with renewable energy priorities recommended by the U.S. Government. Larger scale hydrogen fueling stations have been proposed in government demonstration projects in preparation for building a national infrastructure. In January 2001, HyGen Industries LLC and Hamilton Sundstrand Space Systems International, Inc., in Torrance, Calif., undertook a project to develop, demonstrate, deploy, commercialize and market renewable hydrogen generation for vehicle fueling systems. In July 2001 the first hydrogen production and fueling station in the Los Angeles area started operation at Honda Motor Company's research and development center. In October 2001 a hydrogen refueling station was installed in Brunnthal-Nord, near Munich, for refueling of a small test fleet of fuel-cell powered buses to connect southeast localities with the east railway station of Munich. The technology was provided by ET (Energy Technology), a company founded in 1997 by hydrogen experts from the space company DASA. The Munich installation was the fourth in Germany after previous installations at the Munich Airport and in Hamburg and Oberstdorf. In 2003, the Schatz Hydrogen Generation Center installed a complete hydrogen production, compression, storage, and dispensing facility at SunLine Transit Agency in Thousand Palms, Calif. The facility provides compressed hydrogen at 3600 psig for use in the SERC hydrogen fuel cell-powered vehicle fleet operated by SunLine Transit and the City of Palm Desert.

However, such current efforts to create renewable energy refueling stations face a number of intractable problems. Stations which take in compressed hydrogen gas for generation of electricity for refueling electric vehicles have problems with the cost and safety of transporting remotely-generated hydrogen to the station, and the large infrastructure costs of providing sufficient on-site electrical energy storage for use in recharging electric vehicles. Vehicles that come to a central refueling station may experience a long refueling delay to recharge vehicle batteries or to take in hydrogen gas for on-board fuel cell generators. Long delays in refueling each vehicle multiply into worse problems of long lines and traffic congestion for vehicle operators. It is deemed highly desirable to provide a renewable energy refueling approach using facilities that are distributed and adapted to refuel electric vehicles on a personal scale.

SUMMARY OF INVENTION

In accordance with the present invention, a personal refueling station for a personal-sized electric vehicle comprises:

(a) a polygonal base structure adapted to be installed on horizontal ground;

(b) a plurality of flat panels, each being substantially triangular in shape and having a mounting edge mounted by a hinge to a corresponding edge of the polygonal base structure and side edges extending from the mounting edge to an upper tip;

(c) an electric-vehicle refueling system housed below an upper surface of the polygonal base structure; and (d) means for opening and closing the plurality of flat panels between an open position wherein they lie substantially flat on the ground forming a substantially flat surface with the base structure which allows the vehicle to be parked on the surface of the base structure and refueled by the electric-vehicle refueling system housed therein, and a closed position wherein the flat panels are folded to an upright pyramidal position with their side edges and tips coming together to form an enclosed housing for the vehicle therein.

The present invention solves the problems of renewable energy refueling systems for electric vehicles by providing a personal refueling station for a vehicle. The personal refueling station is of compact design and dimensions to enable its installation at the home or business location of the vehicle. Refueling delays and traffic congestion are avoided by refueling the vehicle parked on the personal refueling station at times when the vehicle is not being used, such as at night. The personal-sized station is provided with electrical energy storage sufficient for charging up to one vehicle. Electricity is supplied from an on-site renewable energy system, such as a solar PV cell array or a hydrogen fuel cell generator. The personal refueling station can also serve as an energy source supplying excess electricity to the associated home or business location of the vehicle owner. The station may also be configured as a secure storage facility for the vehicle, such as by having folding leaves that support the solar PV cell array during the day fold up at night into an enclosed pod or housing for the vehicle.

The personal refueling station is designed to accommodate a personal-use electric vehicle such as an electric car or cart. However, it may also be used for other types of electric vehicles. Vertical takeoff and landing (VTOL) hovercraft for personal use are under near-term development, for example, as described in U.S. patent application Ser. No. 10/763,973, entitled "Quiet Vertical Take-off Landing Hover Aircraft Using Ducted, Magnetic Induction Air-Impeller Rotors", filed on Jan. 22, 2004, by inventors in common herewith, which is incorporated by reference herein. Such personal hovercraft vehicles use electricity stored in on-board batteries or generated by on-board fuel cells, and would be suitably refueled using the personal refueling station of the present invention. The personal refueling system would also serve as a personal landing dock/port for the personal hovercraft vehicle.

The personal refueling station can be used in a stationary location or transported for remote use. When used for home, rescue service stations, or company vehicles, it can be placed in a permanent and stationary setting with utility hookups of 'water in' and optional 'hydrogen out' to the home, rescue service station, or company, to serve as a backup for energy needs. For uses in which remote deployment of electric VTOL vehicles is needed, the personal refueling station can be fitted with wheels or a rolling undercarriage to allow it to be towed to a remote location.

The personal refueling station makes dual use of a platform structure mounting foldable side wall leaves as support surfaces for solar PV cell arrays to convert sunlight to hydrogen (by electrolysis) when opened, and as an enclosed pod or housing when closed. The personal refueling station can also have utility plugs for alternative renewable power sources for those users who have on-site windmills, hydrogenerators, or biothermal systems. For non-hydrogen electric vehicles using batteries, the personal refueling station would replace the hydrogen storage and pump system with an electric battery bank and zap charging system for the vehicle.

Other objects, features, and advantages of the present invention will be explained in the following detailed description of the invention having reference to the appended drawings.

DETAILED DESCRIPTION OF INVENTION

Figure 1:
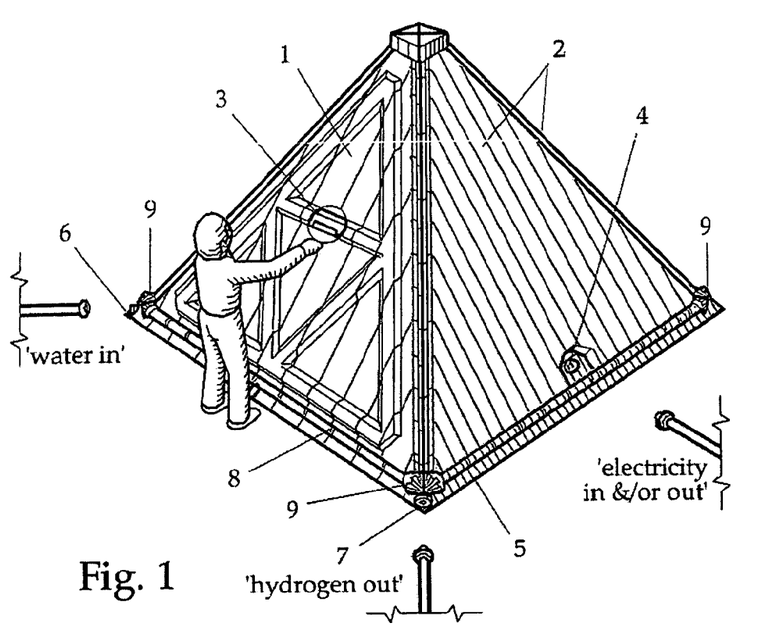
FIG. 1 is a perspective view of a personal refueling station in accordance with the present invention.

Referring to FIG. 1, a four-sided embodiment of a personal refueling station (in closed position) is shown for refueling and storage of a personal-sized electric vehicle. The station has a base (5) fitted with hinges supporting a front panel (1) and three other primary panels (2) of substantially triangular shape which fold up into an upright pyramid shape when closed. All panels may be made from light-weight composite material. The front panel (1) has a handle/locking device (3) for opening up the station. The front panel (1) serves as the access entrance/ramp for the station and has reinforced ridges on its inner surface to help support people walking on it when open. The other primary panels (2) support solar photovoltaic (PV) cell arrays on their inner surfaces for generating electricity when opened to sunlight. The generated electricity can be used to generate hydrogen, through electrolysis of water, for refueling hydrogen-fuel-cell vehicles, or stored in battery storage for recharging non-hydrogen electric vehicles. Alternatively, the refueling system can store electricity generated by a hydrogen fuel cell system or by an external renewable power source. One of the side panels has an opening near the base (5) to expose the utility plug(s) (4) located on the base (5) for connecting a cable for 'electricity in' from an alternative renewable power source or for 'electricity out' to an associated home or business location or other external usage. The base (5), which is made from composite material, also has a connection valve (6) for 'water in' and another connection valve (7) for 'hydrogen out' to the home, business location, or another refueling station. All of the panels are attached to the base (5) via spring-loaded hinges (8) that have toothed/geared end/tips (9) that are meshed together at the corners to ensure that the panels all open and close together in unison.

Figure 2:
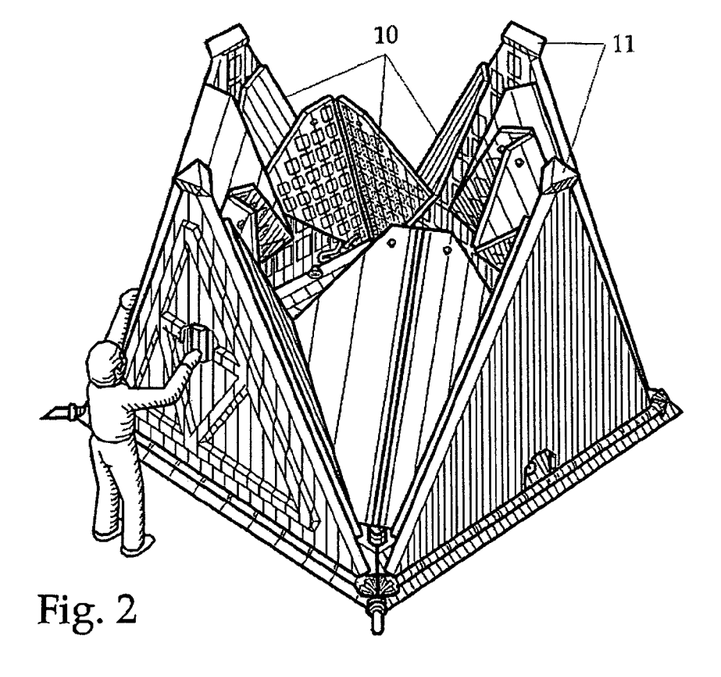
FIG. 2 is a perspective view of a personal refueling station being opened.

In FIG. 2, the personal refueling station is shown being opened to expose secondary panels (10) which are connected to the primary panels (1,2) by a series of hinges to open them all together with an origami-like effect. The top/tip of the primary panels each have a rubber wedge (11) acting as a cushion when fully opened and when closed.

Figure 3:
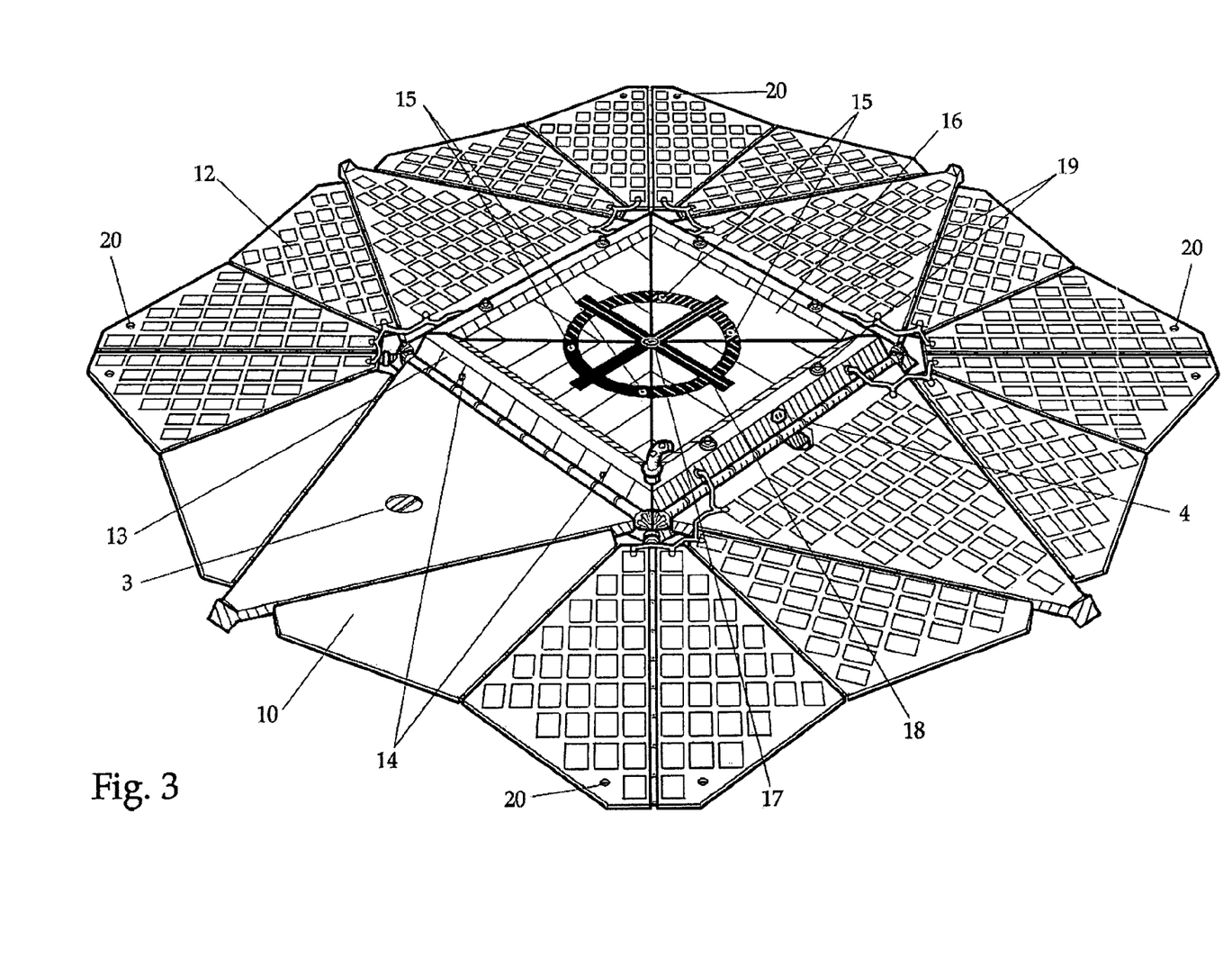
FIG. 3 is a perspective view of a personal refueling station fully opened.

In FIG. 3, the four-sided embodiment of the personal refueling station is shown opened flat exposing the backside of the front panel (1) and the primary panels (2) with the secondary panels (10) filling the spaces in between them. The handle/locking device (3) needs to be locked when opened to hold all of the panels in place to avoid flapping or closing from gusts of wind. Except for the front panel (1) and the two secondary panels (10) connected to it which are used as an access ramp that is walked on, all of the other panels are covered or mounted with thin film photovoltaic (PV) solar cell arrays (12) which receive sunlight and generate electricity for use or storage by the personal refueling station's inner components. The inner components are positioned under the floor of the base and are covered by dock lids, which are four quarter panels made from composite material hinged on the four sides of the base. The front dock lid (13) has front bolts (14) connecting it to the base (5) and top bolts (15) connecting it to the other dock lids (16). These dock lids (16) are connected to the base (5) by hinges and have top bolts (15) that connect them together. All of the dock lids are joined in the center, at a slight angle, by a water drain (17) to collect rainfall. For use with personal VTOL vehicles, the dock lids also have a large landing target (18) and landing lights (19). The secondary panels (10) also have a hole (20) at its outer tip used for optional wind anchors (not shown), if needed.

Figure 4:
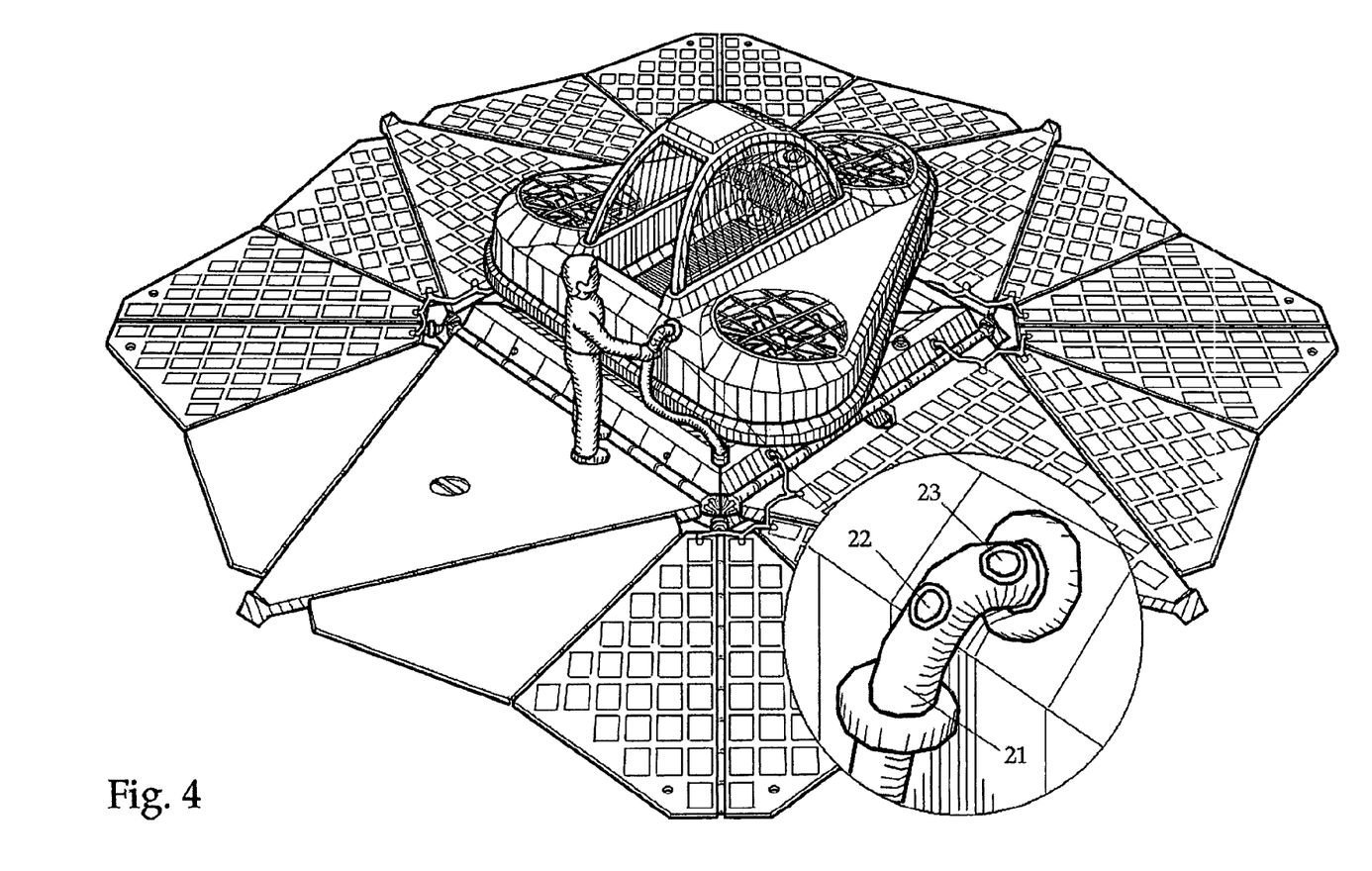
FIG. 4 is a perspective view of a personal refueling station being used to fuel a vehicle.

In FIG. 4, the personal refueling station is shown being used to fuel a personal VTOL vehicle, for example, as described in U.S. patent application Ser. No. 10/763,973, which is incorporated herein by reference. The vehicle is rolled or landed onto the base and refueled with hydrogen or electricity by a manually-operated retractable pump/charge device (21). In the inset, the device (21) is shown having an on/off button (22) to control the pumping/charging and a release button (23) to disconnect the snap tight pump/charge device (21) from the vehicle after pumping/charging. When used for remote deployment without a human operator, the control systems can employ an optional robotic arm (not shown), instead of the manually operated retractable pump/charge device (21). An optional locking system (not shown) can be added to the on/off button (22), if needed.

Figure 5:
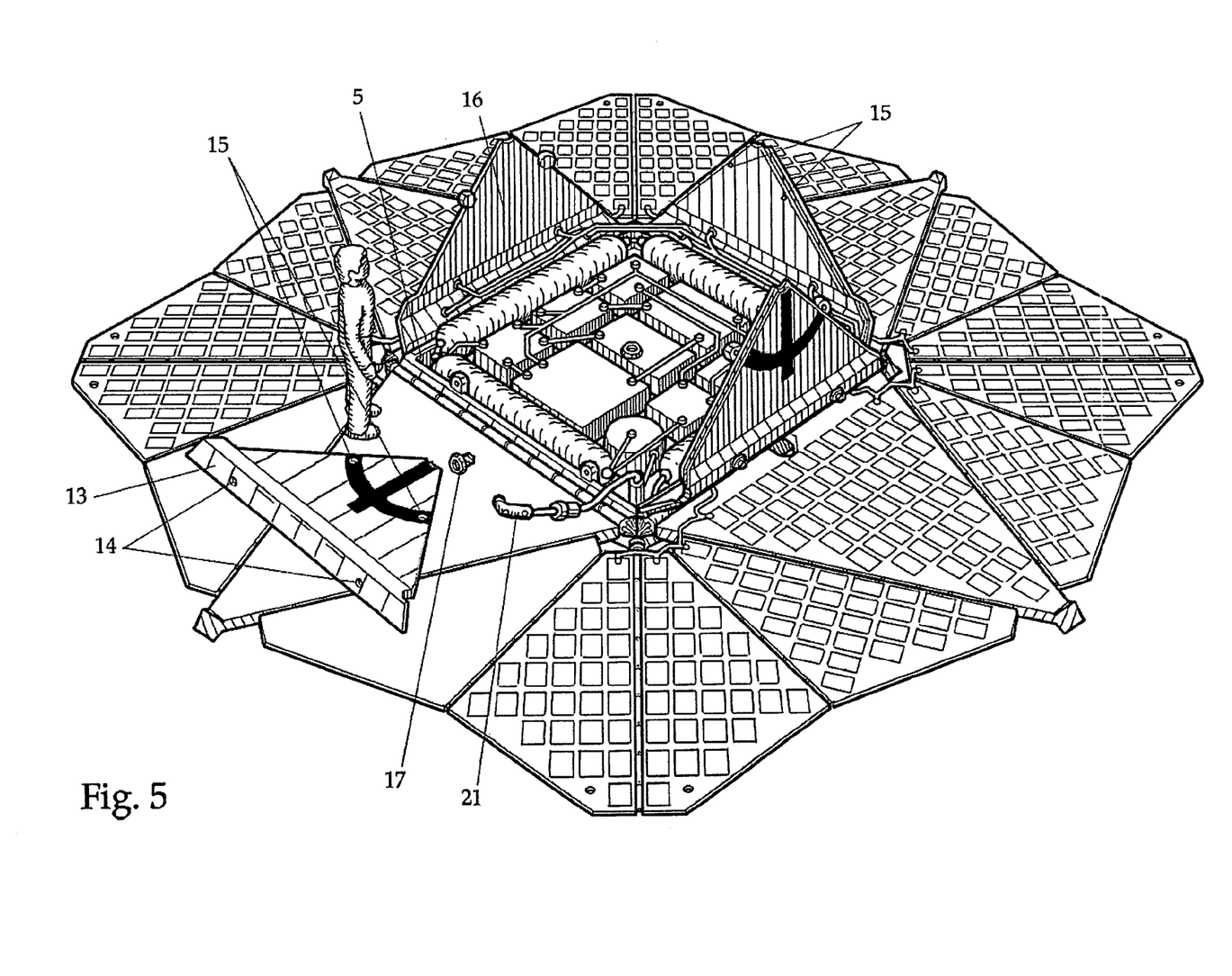
FIG. 5 is a perspective view of a personal refueling station opened flat with its dock lid open exposing the inner components.

In FIG. 5, the personal refueling station is shown opened flat with its dock lids open exposing the inner components housed in the base (5). The front bolts (14), top bolts (15) and the water drain (17) have all been removed allowing the front dock lid (13) to be set aside. The other dock lids (16) have spring-loaded hinges that are relaxed in this open position.

Figure 6:
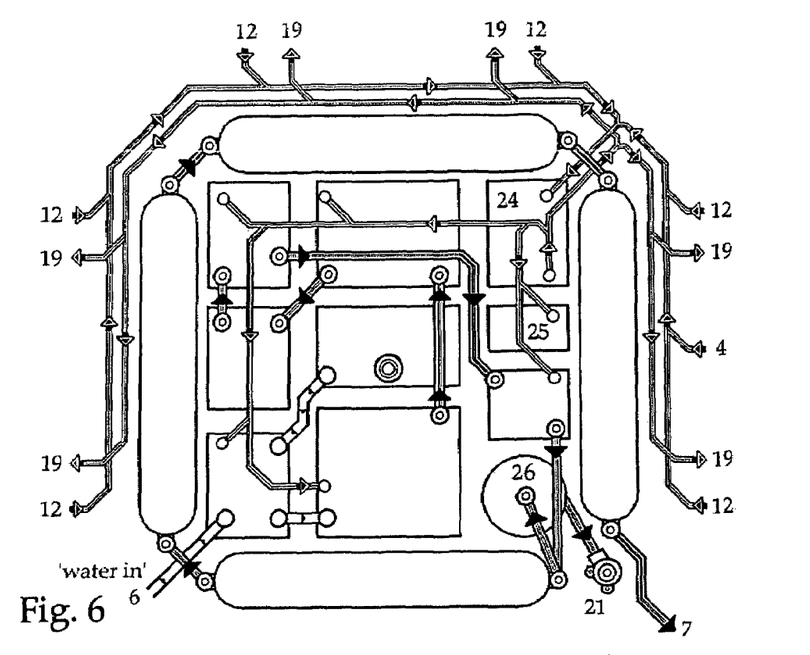
FIG. 6 is a top view of the inner components of a hydrogen refueling system.

In FIG. 6, a top view of the inner components of a hydrogen/electrolysis system shows the flow of 'electricity in' via the plug (4), which can come from the solar array or an alternative or other external source, the flow of 'electricity out' to landing lights (19) or other on-board electrical components, the flow of 'water in' via the connector (6), which can come from a utility water source or collected rainfall, and the flow of 'hydrogen out' via the connector (7), which goes to the pump and/or an optional home/station/company energy system. The station/dock has a primary battery and voltage regulator (24) to power all of its components, a central processing unit (CPU) (25) to control all of the components, and a retractable pumping device (26). The CPU (25) can also operate on-board communication systems such as an audible signal and/or voice to indicate system readiness and pumping progress.

Figure 7:
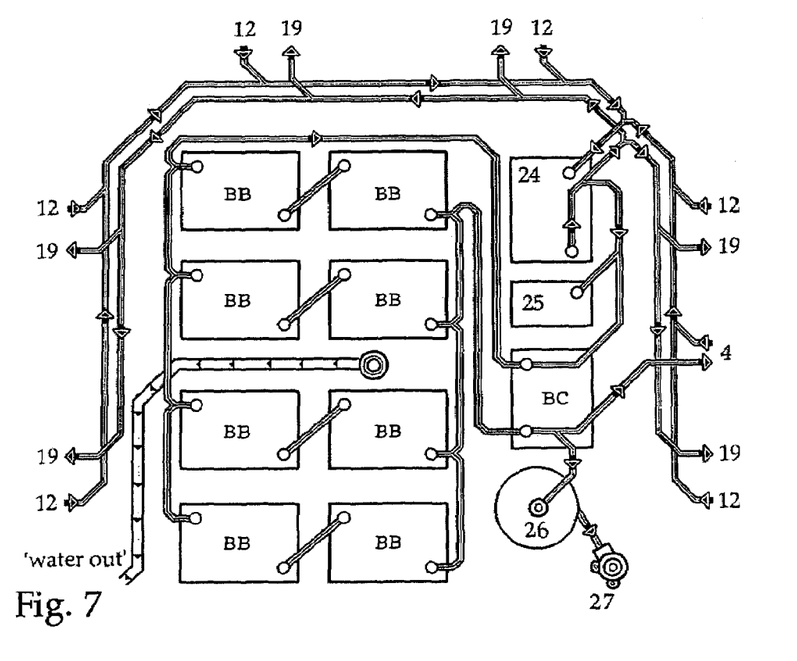
FIG. 7 is a top view of the inner components of a non-hydrogen system.

In FIG. 7, a top view of the inner components of a non-hydrogen/battery bank system showing the flow of 'electricity in' via the plug (4), which can come from the solar array or an alternative or other external source, and the flow of 'electricity out' to the station/dock electrical components, a zap charger (27), and/or as excess power to an external home/station/company energy system. The station/dock has an array of battery storage devices BB, a primary battery/converter BC, and a voltage regulator (24) coupled together, and a CPU (25) to control all of the components and the zap charger device (27). The CPU (25) can also operate on-board communication systems such as an audible signal and/or voice to indicate system readiness and pumping progress.

Figure 8:
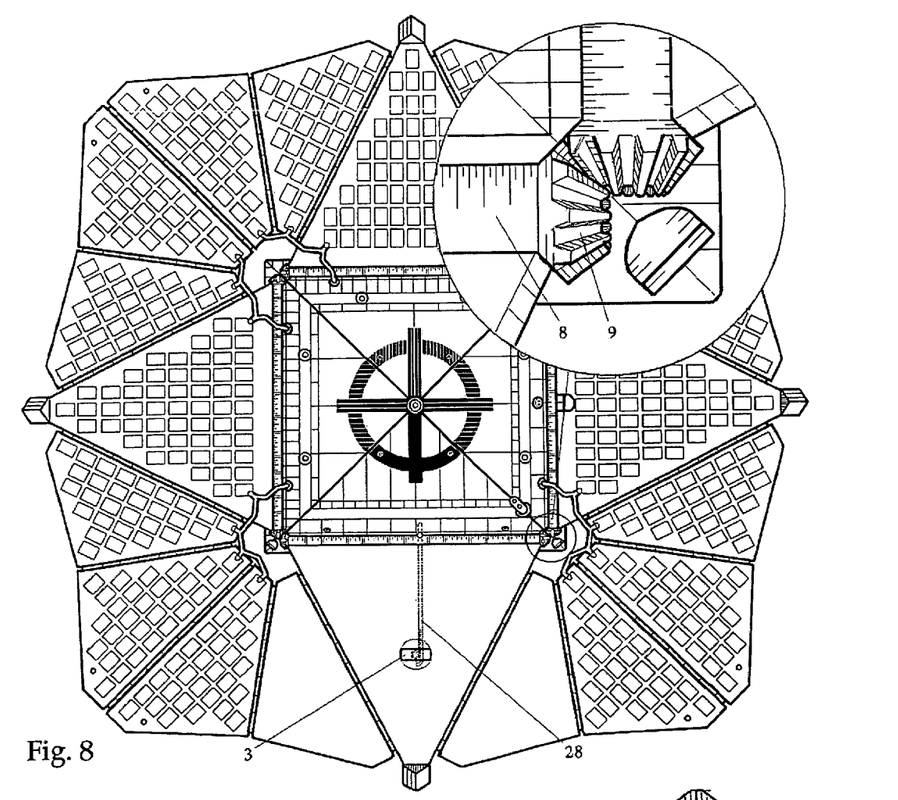
FIG. 8 is a top view of a four-sided personal refueling station opened flat.

In FIG. 8, a top view of the personal refueling station opened flat highlights the toothed/geared end/tips (9) of the spring-loaded hinges (8) which connect them together in a continuously meshed structure to ensure the opening and closing of the all primary panels in unison. Also highlighted is the handle/locking device (3), on the front panel (1), showing an actuator such as a toothed rod (28) that slides into a slot in the base (5) locking the panels in place. For remote, unattended deployment, the locking device (3) and actuator (28) can be operated by a remote control motor (not shown) to actuate the unlocking/locking of the panels and the toothed/geared end/tips (9) for automatically opening and closing the station structure.

Figure 9:
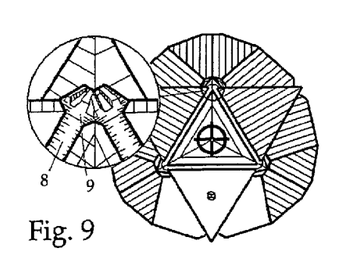
FIG. 9 is a top view of a three-sided personal refueling station opened flat.

FIG. 9 shows a top view of a three-sided variation of the personal refueling station in the open position, highlighting the toothed/geared end/tips (9) on the spring loaded hinges (8) which connect the triangular primary panels together in a continuously meshed structure to ensure the opening and closing of the all primary panels in unison.

Figure 10:
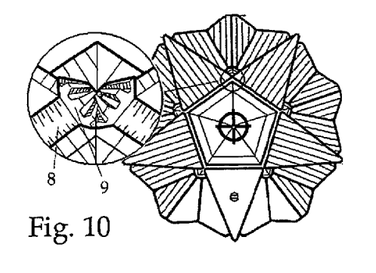
FIG. 10 is a top view of a five-sided personal refueling station opened flat.

FIG. 10 shows a top view of a five-sided variation of the personal refueling station also highlighting the toothed/geared end/tips (9) on the spring loaded hinges (8) for opening and closing of the all primary panels in unison.

Figure 11:
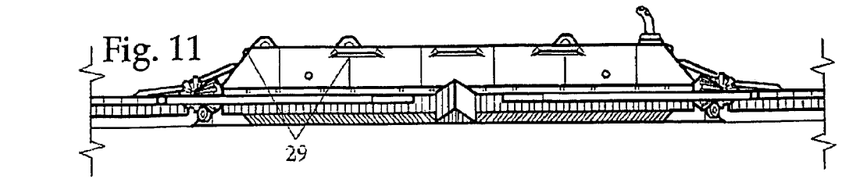
FIG. 11 is an elevation view of a personal refueling station opened flat.

FIG. 11 is an elevation view of the four-sided personal refueling station opened flat, highlighting exhaust vents (29) provided at the top edges of the dock lids for venting and heat exhaustion from the inner components. While opened flat the panels' weight keeps them in this position even though all of the spring-loaded hinges are at their maximum tension. The toothed rod (28) is actuated by the handle/locking device (3) to lock the panels together and keep them flat against gusting. For remote deployment, the personal refueling station can be fitted with retractable wheels or a rolling undercarriage to allow it to be towed to a remote location.

Figure 12:
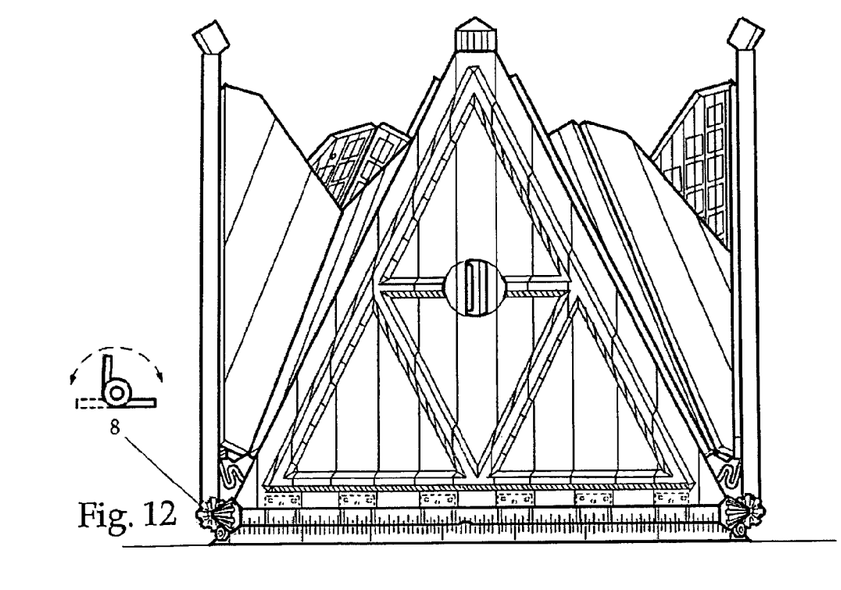
FIG. 12 is an elevation view of a personal refueling station being closed.

In FIG. 12, the four-sided personal refueling station is shown in elevation being closed, with the primary panels being lifted to 90° by the spring-loaded hinges (8) then relaxed together to the fully closed position.

Figure 13:
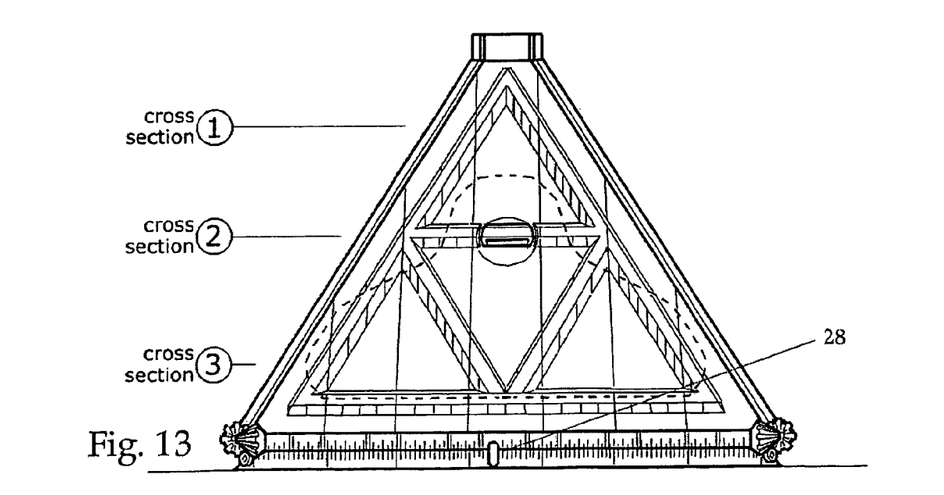
FIG. 13 is an elevation view of a closed personal refueling station showing 3 cross sections through the structure.

FIG. 13 is an elevation view of the personal refueling station in the fully closed position. The edges and tips of the panels are pressed together to form a secure seal against penetration by external elements, thereby forming a sheltered enclosure for the vehicle within. The states of the panels at three cross sections 1, 2, 3 are to be explained further below with respect to FIG. 14. The tip of the locking/unlocking actuator (28) of the handle/locking device (3) can be seen locking the panels in a closed position. Also highlighted, with a dotted line, is the available space inside of the personal refueling station for storage of the vehicle within.

Figure 14:
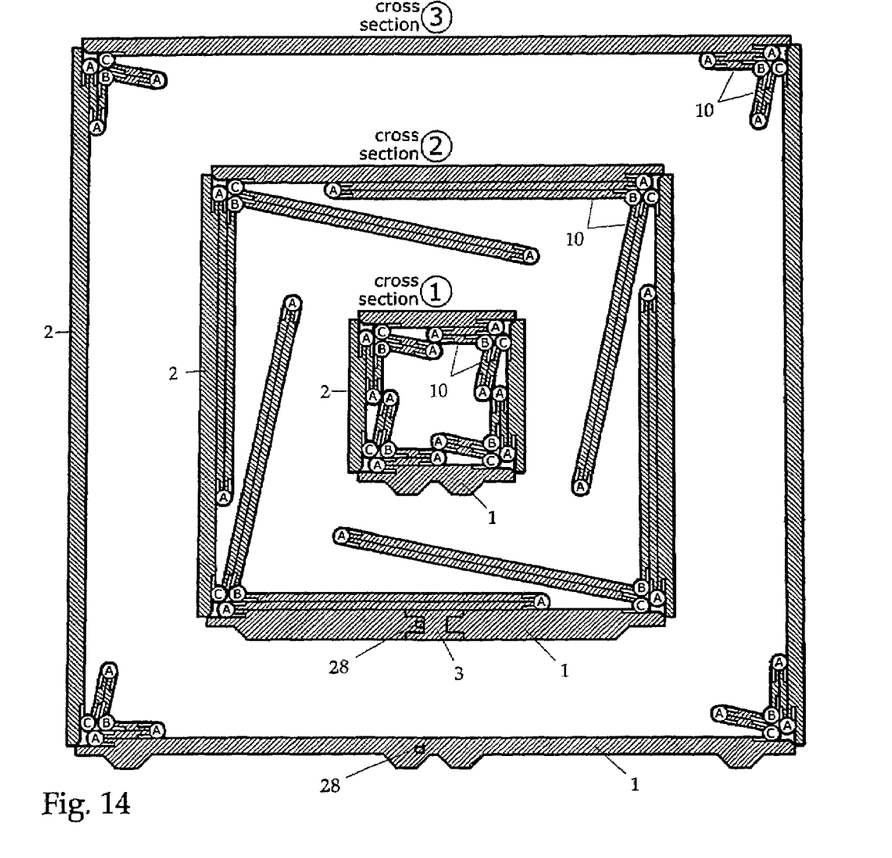
FIG. 14 is a composite cross sectional view of a closed personal refueling station showing the states of the panels at the 3 cross sections through the structure.
Figure 14A:
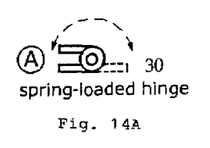
FIGS. 14A–14C shows three kinds of hinges used in its folding structure.
Figure 14B:
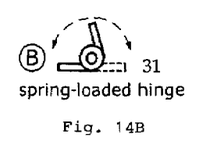
Figure 14C:
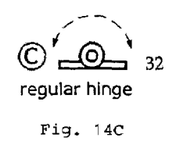

FIG. 14 is a top view of the closed personal refueling station showing the origami folding of the panels together assisted by three kinds of hinges A, B, and C. Hinge 30 is a spring loaded hinge having a relaxed or neutral position A with the hinge leaves closed. Hinge 31 is a spring loaded hinge having a relaxed or neutral position B with the hinge leaves at an angular position. Hinge 32 is a regular hinge without spring loading that is neutral in all positions. The spring-loaded hinges (30) have the most tension when opened flat and will fold first when closing the panels of the personal refueling station, to be followed by the angled spring-loaded hinges (31), and then the regular hinges (32) that follow with gravity. In the closed position, all of the panels fold together in an automatic origami folding motion under spring-loaded tension to return the hinges to their neutral positions A, B, C, as shown in each cross sectional view 1, 2, 3. Also seen in the cross section views 2 and 3 are the ends of the actuator rod (28) and the handle/locking device (3) in the front panel (1).

In summary, the personal refueling station of the present invention has a compact design to enable its installation and use at home or business locations for a personal-sized vehicle. The station allows refueling of the vehicle at the operator's location at times when the vehicle is not being used, such as at night. The personal-sized station generates electricity or hydrogen using solar PV cell arrays mounted on-site for charging up one vehicle. Alternatively, electricity may be supplied from a hydrogen fuel cell generator or an external renewable energy source. The personal refueling station can also serve as an energy source supplying excess electricity to the associated home or business location of the vehicle owner. The station folds into an enclosed structure as a secure storage facility for the vehicle, which may be an electric car or cart or other types of electric vehicles such as an electric-powered hovercraft for personal use, and can be used in a stationary location or transported for remote use. The personal refueling station of the invention thus provides an on-site facility for refueling and storage of personal-use electric vehicles which can be distributed and installed at home and business locations and is adapted for use on a personal scale.

It is understood that many modifications and variations may be devised given the above description of the principles of the invention. It is intended that all such modifications and variations be considered as within the spirit and scope of this invention, as defined in the following claims.

The invention claimed is:

1. A personal refueling station for a personal-sized electric vehicle comprising:
   (a) a polygonal base structure adapted to be installed on horizontal ground;
   (b) a plurality of flat panels, each being substantially triangular in shape and having a mounting edge mounted by a hinge to a corresponding edge of the polygonal base structure and side edges extending from the mounting edge to an upper tip;
   (c) an electric-vehicle refueling system housed below an upper surface of the polygonal base structure; and
   (d) means for opening and closing the plurality of flat panels between an open position wherein they lie substantially flat on the ground forming a substantially flat surface with the base structure which allows the vehicle to be parked on the surface of the base structure and refueled by the electric-vehicle refueling system housed therein, and a closed position wherein the flat panels are folded to an upright pyramidal position with their side edges and tips coming together to form an enclosed housing for the vehicle therein.

2. A personal refueling station according to claim 1, wherein solar photovoltaic (PV) cell arrays are mounted to respective inner surfaces of the plurality of flat panels and coupled to the refueling system to produce electricity when opened to sunlight which is stored by the refueling system.

3. A personal refueling station according to claim 2, wherein the electricity from the solar PV arrays is used to generate hydrogen through electrolysis of water, and the hydrogen is used by the refueling system to refuel a hydrogen-fuel-cell vehicle.

4. A personal refueling station according to claim 2, wherein the electricity from the solar PV arrays is stored in a battery storage array which is used by the refueling system to recharge a non-hydrogen electric vehicle.

5. A personal refueling station according to claim 2, wherein the electricity from the solar PV arrays is stored in a battery storage array and used in part by the refueling system to supply excess electricity to an external electricity usage.

6. A personal refueling station according to claim 2, wherein the electricity from the solar PV arrays is used to generate hydrogen through electrolysis of water, and the hydrogen is used by the refueling system to supply excess hydrogen to an external hydrogen usage.

7. A personal refueling station according to claim 1, wherein hydrogen is provided from an external renewable energy hydrogen source and used by the refueling system to refuel a hydrogen-fuel-cell vehicle.

8. A personal refueling station according to claim 1, wherein electricity is provided from an external renewable energy power source and stored in a battery storage array which is used by the refueling system to recharge a non-hydrogen electric vehicle.

9. A personal refueling station according to claim 1, wherein said flat panels are mounted by spring-loaded hinges to the base structure for opening under spring tension and closing assisted by spring tension.

10. A personal refueling station according to claim 9, further comprising a locking mechanism to hold said flat panels in the open and closed positions.

11. A personal refueling station according to claim 9, further comprising corner gears provided at the ends of the one edge of each flat panel which are meshed together with those of the other panels to create a continuously meshed structure to ensure that said flat panels open and close in unison.

12. A personal refueling station according to claim 1, wherein said station is designed to accommodate a personal-use electric vehicle such as an electric car or cart.

13. A personal refueling station according to claim 12, wherein one of said flat panels is used as a front access panel for rolling the personal-use electric vehicle on and off the base structure.

14. A personal refueling station according to claim 1, wherein said station is designed to accommodate a vertical takeoff and landing (VTOL) hovercraft for personal use.

15. A personal refueling station according to claim 14, wherein said station has a landing target and landing lights for the VTOL hovercraft for personal use.

16. A personal refueling station according to claim 1, wherein said station is designed to accommodate utility hookups of 'water in' and optional 'hydrogen out' to the home, rescue service station, or company, or to serve as a backup for energy needs.

17. A personal refueling station according to claim 1, wherein said station is adapted for use in remote deployment of an electric vehicle.

18. A personal refueling station according to claim 17, wherein said personal refueling station is fitted with wheels or a rolling undercarriage to allow it to be towed to a remote location.

19. A personal refueling station according to claim 1, further comprising utility plugs for providing alternative renewable power to the refueling system from an external windmill, hydrogenerator, or biothermal system.

20. A personal refueling station according to claim 1, wherein said station is designed to be operated automatically by remote control.

* * * * *